United States Patent
Evans (10) Patent No.: US 9,434,281 B2
(45) Date of Patent: Sep. 6, 2016

(54) ENERGY ABSORBING SEAT FOR A VEHICLE

(75) Inventor: Jonathan Evans, Canton, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/823,038

(22) PCT Filed: Sep. 14, 2011

(86) PCT No.: PCT/US2011/051558
§ 371 (c)(1),
(2), (4) Date: Mar. 13, 2013

(87) PCT Pub. No.: WO2012/037222
PCT Pub. Date: Mar. 22, 2012

(65) Prior Publication Data
US 2013/0169012 A1     Jul. 4, 2013

Related U.S. Application Data

(60) Provisional application No. 61/382,581, filed on Sep. 14, 2010.

(51) Int. Cl.
*B60N 2/68* (2006.01)
*B60N 2/427* (2006.01)
*B60N 2/42* (2006.01)

(52) U.S. Cl.
CPC ......... *B60N 2/42709* (2013.01); *B60N 2/4228* (2013.01); *B60N 2/42745* (2013.01); *B60N 2/68* (2013.01); *B60N 2/682* (2013.01)

(58) Field of Classification Search
CPC ............ B60N 2/42709; B60N 2/4228; B60N 2/42745; B60N 2/68; B60N 2/682
USPC .................................................... 297/216.13
See application file for complete search history.

(56) References Cited

U.S. PATENT DOCUMENTS 3,544,164 A    12/1970  Ohta
3,802,737 A *   4/1974  Mertens .................... 297/216.2
(Continued)

FOREIGN PATENT DOCUMENTS

CN    1502506 A    6/2004
CN    1602258 A    3/2005
(Continued)

OTHER PUBLICATIONS

English language abstract and machine-assisted English translation for DE 4421946 extracted from the espacenet.com database on Jun. 21, 2013, 16 pages.
(Continued)

*Primary Examiner* — Syed A Islam
(74) *Attorney, Agent, or Firm* — Howard & Howard Attorneys PLLC (57) ABSTRACT

A seat supports an occupant of a vehicle. The seat comprises a seating frame member for providing a surface to support the occupant and a back frame member extending away from the seating frame member. The back frame member has a first side member and a second side member. A first cross member and a second cross member extend horizontally between the first and second side members. Each of the first and second cross members have a central region flanked on both sides by bent portions with the first and second cross members folded back upon themselves within the bent portions. The bent portions straighten out when a force above a predetermined value is applied to the first and second cross members. The central region plastically deforms once the bent portions straighten out for reducing an impact force transferred from the seat to the occupant.

15 Claims, 8 Drawing Sheets

(56) References Cited

U.S. PATENT DOCUMENTS

| | | | |
|---|---|---|---|
| 4,109,959 A | | 8/1978 | Barecki et al. |
| 4,192,545 A | | 3/1980 | Higuchi et al. |
| 4,249,769 A | | 2/1981 | Barecki |
| 4,598,950 A | | 7/1986 | Fourrey |
| 4,997,233 A | | 3/1991 | Sharon |
| 5,054,845 A | * | 10/1991 | Vogel .................. 297/216.14 |
| 5,219,202 A | | 6/1993 | Rink et al. |
| 5,249,840 A | | 10/1993 | Hoshihara et al. |
| 5,310,247 A | | 5/1994 | Fujimori et al. |
| 5,447,360 A | | 9/1995 | Hewko et al. |
| 5,509,716 A | | 4/1996 | Kolena et al. |
| 5,645,316 A | | 7/1997 | Aufrere et al. |
| 5,676,421 A | | 10/1997 | Brodsky |
| 5,681,091 A | * | 10/1997 | Larson et al. .......... 297/452.21 |
| 5,697,478 A | | 12/1997 | Di Stefano |
| 6,003,937 A | | 12/1999 | Dutton et al. |
| 6,022,074 A | | 2/2000 | Swedenklef |
| 6,053,571 A | | 4/2000 | Faigle |
| 6,109,690 A | | 8/2000 | Wu et al. |
| 6,142,563 A | | 11/2000 | Townsend et al. |
| 6,290,292 B1 | * | 9/2001 | Tsukada .................. 297/216.14 |
| 6,409,263 B1 | | 6/2002 | Seibold |
| 6,520,577 B2 | | 2/2003 | Kitagawa |
| 6,523,893 B2 | | 2/2003 | Kamper et al. |
| 6,641,214 B2 | | 11/2003 | Veneruso |
| 6,709,053 B1 | | 3/2004 | Humer et al. |
| 6,761,412 B1 | | 7/2004 | Garnweidner et al. |
| 6,820,931 B2 | | 11/2004 | Ruff et al. |
| 6,926,358 B2 | | 8/2005 | Fujita et al. |
| 6,994,399 B2 | | 2/2006 | Van-Thournout et al. |
| 7,070,236 B2 | | 7/2006 | Kawashima |
| 7,354,105 B2 | | 4/2008 | Nelson et al. |
| 7,497,462 B2 | | 3/2009 | Sakai et al. |
| 7,537,283 B2 | | 5/2009 | Niitsuma et al. |
| 7,854,477 B2 | | 12/2010 | Axelsson et al. |
| 7,992,934 B2 | | 8/2011 | Cailleteau |
| 8,033,602 B2 | | 10/2011 | Yamaki et al. |
| 9,168,855 B2 | | 10/2015 | Evans et al. |
| 2001/0052724 A1 | | 12/2001 | Kamper et al. |
| 2004/0061364 A1 | | 4/2004 | Humer et al. |
| 2004/0135400 A1 | * | 7/2004 | Matsuzaki et al. ...... 296/193.02 |
| 2005/0145597 A1 | | 7/2005 | Kull et al. |
| 2006/0103191 A1 | | 5/2006 | De Wilde et al. |
| 2008/0038569 A1 | * | 2/2008 | Evans et al. .............. 428/474.9 |
| 2008/0100104 A1 | | 5/2008 | Axelsson et al. |
| 2008/0258519 A1 | | 10/2008 | Niitsuma et al. |
| 2009/0001786 A1 | | 1/2009 | Haglund |
| 2009/0021061 A1 | * | 1/2009 | Yamaki et al. .......... 297/216.13 |
| 2010/0096892 A1 | | 4/2010 | Meghira et al. |
| 2010/0176621 A1 | | 7/2010 | Aufrere et al. |
| 2010/0194157 A1 | | 8/2010 | Nitsuma et al. |
| 2010/0259076 A1 | | 10/2010 | Meghira et al. |
| 2011/0043008 A1 | | 2/2011 | Reel |

FOREIGN PATENT DOCUMENTS

| | | |
|---|---|---|
| CN | 1640714 A | 7/2005 |
| CN | 1955043 A | 5/2007 |
| CN | 101348088 A | 1/2009 |
| DE | 4421946 A1 | 6/1995 |
| DE | 19831218 A1 | 1/2000 |
| EP | 0709249 A2 | 5/1996 |
| EP | 0888926 A1 | 1/1999 |
| EP | 2127941 A1 | 12/2009 |
| FR | 2927581 A1 | 8/2009 |
| JP | H 04-231913 A | 8/1992 |
| JP | H 10-230767 A | 9/1998 |
| JP | 10-309968 A | 11/1998 |
| JP | 2010-500198 A | 1/2010 |
| WO | WO 2006/083024 A1 | 8/2006 |
| WO | WO 2006/093644 A1 | 9/2006 |
| WO | WO 2012/037218 A1 | 3/2012 |
| WO | WO 2012/037233 A1 | 3/2012 |

OTHER PUBLICATIONS

English language abstract and machine-assisted English translation for DE 19831218 extracted from the espacenet.com database on Jun. 21, 2013, 18 pages.

English language abstract and machine-assisted English translation for EP 0888926 extracted from the espacenet.com database on Jun. 21, 2013, 31 pages.

English language abstract for EP 2127941 extracted from the espacenet.com database on Jun. 25, 2013, 17 pages.

English language abstract and machine-assisted English translation for FR 2927581 extracted from the espacenet.com database on Jun. 25, 2013, 37 pages.

English language abstract and machine-assisted English translation for JP 10-309968 extracted from the PAJ database on Jun. 25, 2013, 43 pages.

International Search Report for Application No. PCT/US11/51554 dated Feb. 13, 2012, 2 pages.

International Search Report for Application No. PCT/US11/51558 dated Feb. 16, 2012, 2 pages.

International Search Report for Application No. PCT/US11/51571 dated Feb. 13, 2012, 2 pages.

English language abstract for WO 2006/083024 extracted from espacenet.corn database on Oct. 30, 2014, 2 pages. (Corresponds to U.S. Pat. No. 7,537,283 which was previously submitted on Dec. 11, 2013).

English language abstract and machine-assisted English translation for JPH 10-230767 extracted from espacenet.com database on May 28, 2015, 21 pages.

English language abstract for CN 1602258 extracted from espacenet.com database on Jul. 1, 2015, 2 pages.

English language abstract for CN 101348088 extracted from espacenet.com database on Jul. 1, 2015, 2 pages.

English language abstract for CN 1640714 extracted from espacenet.com database on Apr. 1, 2015, 2 pages; (see also English language equivalent U.S. Pat. No. 7,070,236 previously submitted on Dec. 11, 2013).

English language abstract not found for CN 1502506; however, see English language equivalent U.S. Pat. No. 7,497,462. Original document extracted from espacenet.com database on Mar. 11, 2015, 13 pages.

English language abstract and machine-assisted English translation for CN 1955043 extracted from espacenet.com database on Mar. 11, 2015, 25 pages.

English language abstract for JPH 04-231913 extracted from espacenet.com database on Nov. 25, 2015, 2 pages (English language equivalent U.S. Pat. No. 5,219,202 previously submitted on Dec. 11, 2013).

English language abstract not found for JPH 2010-500198; however, see English language equivalent U.S. Pat. No. 9,168,855. Original document extracted from espacenet.com database on Nov. 25, 2015, 24 pages.

* cited by examiner

ENERGY ABSORBING SEAT FOR A VEHICLE

CROSS REFERENCE TO RELATED APPLICATIONS

This application is the National Stage of International Patent Application No. PCT/US2011/051558, filed on Sep. 14, 2011, which claims priority to and all the advantages of U.S. Provisional Patent Application Ser. No. 61/382,582 filed on Sep. 14, 2010 and incorporated herewith in its entirety.

BACKGROUND OF THE INVENTION

1. Field of the Invention

The subject invention generally relates to a seat for a vehicle, and more specifically to the seat having at least one energy absorbing feature.

2. Description of the Related Art

Seats for a vehicle and specifically a back portion of the seat typically must meet structural requirements by having sufficient strength to support repeated loads, which are exerted on the back portion of the seat, or seat back, during a crash event. For example, when a vehicle is hit from behind by another vehicle, a mass of an occupant applies a large force on the seat back over a small time period. To meet these structural requirements, the seat back is generally formed from metal such as steel, aluminum, or magnesium. For example, the seat back made from steel is able to meet the structural requirements by providing sufficient stiffness, strength, and ductility to satisfy the above-mentioned requirements.

Recently, more features and content have been designed into the seat back. As a result, a cost to manufacture the seat back has increased. In order to reduce costs, seat backs previously manufactured from metals are now being manufactured from a polymeric material. The seat backs produced from the polymeric material offer the ability to reduce the number of features and content designed into the seat back and therefore reduce manufacturing and assembly costs. Furthermore, weight reduction is another possible benefit of using polymeric material for the seat back, as well as greater design freedom and reduced profile, giving the vehicle increased interior space. However, the seat back made from the polymeric material must still meet the structural requirements for a crash event. For example, during a rear impact collision, the vehicle is accelerated in a forward direction. This causes the seat back to apply acceleration forces to the occupant over a short period of time. Therefore, the seat backs are typically required to manage the acceleration forces applied to the occupant while not exceeding deformation limits.

SUMMARY OF THE INVENTION AND ADVANTAGES

A seat supports an occupant of a vehicle. The seat comprises a seating frame member for providing a surface to support the occupant. The seat also comprises a back frame member extending away from the seating frame member. The back frame member has a first side member and a second side member spaced from the first side member. Each of the side members have a proximal end, which is coupled to the seating frame member, and a distal end spaced from the proximate end. A first cross member extends horizontally between the first side member and the second side member with the first cross member spaced from the proximal end of the side members. A second cross member extends horizontally between the first side member and the second side member with the second cross member spaced between the first cross member and the distal end of the side members.

Each of the first and second cross members comprise a thermoplastic material. Additionally, the first and second cross members have a central region flanked on both sides by bent portions with the first and second cross members are folded back upon themselves within the bent portions. The bent portions straighten out when a force above a predetermined value is applied to the first and second cross members. The central region plastically deforms once the bent portions straighten out. The straightening out of the bent portions and the plastic deformation of the central region reduce an impact force transferred from the seat to the occupant caused by the force above the predetermined value. Reducing the impact force experienced by the occupant reduces the likelihood of the occupant sustaining injuries as a result of a collision of the vehicle.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE INVENTION

Figure 1:
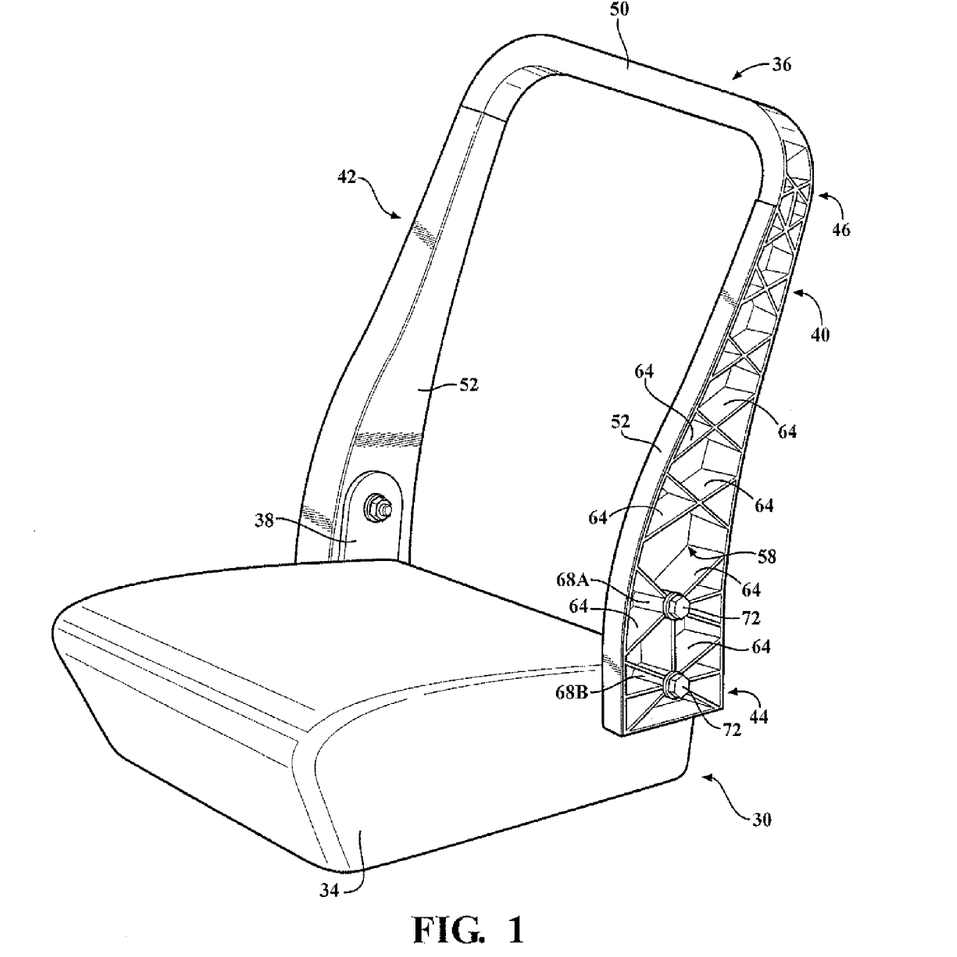
FIG. 1 is a perspective view of a seat including a back frame member and a seating frame member.

Referring to the Figures, wherein like numeral indicate like or corresponding parts throughout the several views, a seat 30 for a vehicle is generally shown. The seat 30 is coupled to the vehicle for supporting an occupant 32 in a standard position within the vehicle. With reference to FIG. 1, the seat 30 includes a seating frame member 34 extending generally horizontally and a back frame member 36 coupled to and extending away from the seating frame member 34. A bracket 38 is coupled to both the seating frame member 34 and the back frame member 36 for coupling the seating frame member 34 to the back frame member 36.

Figure 2:
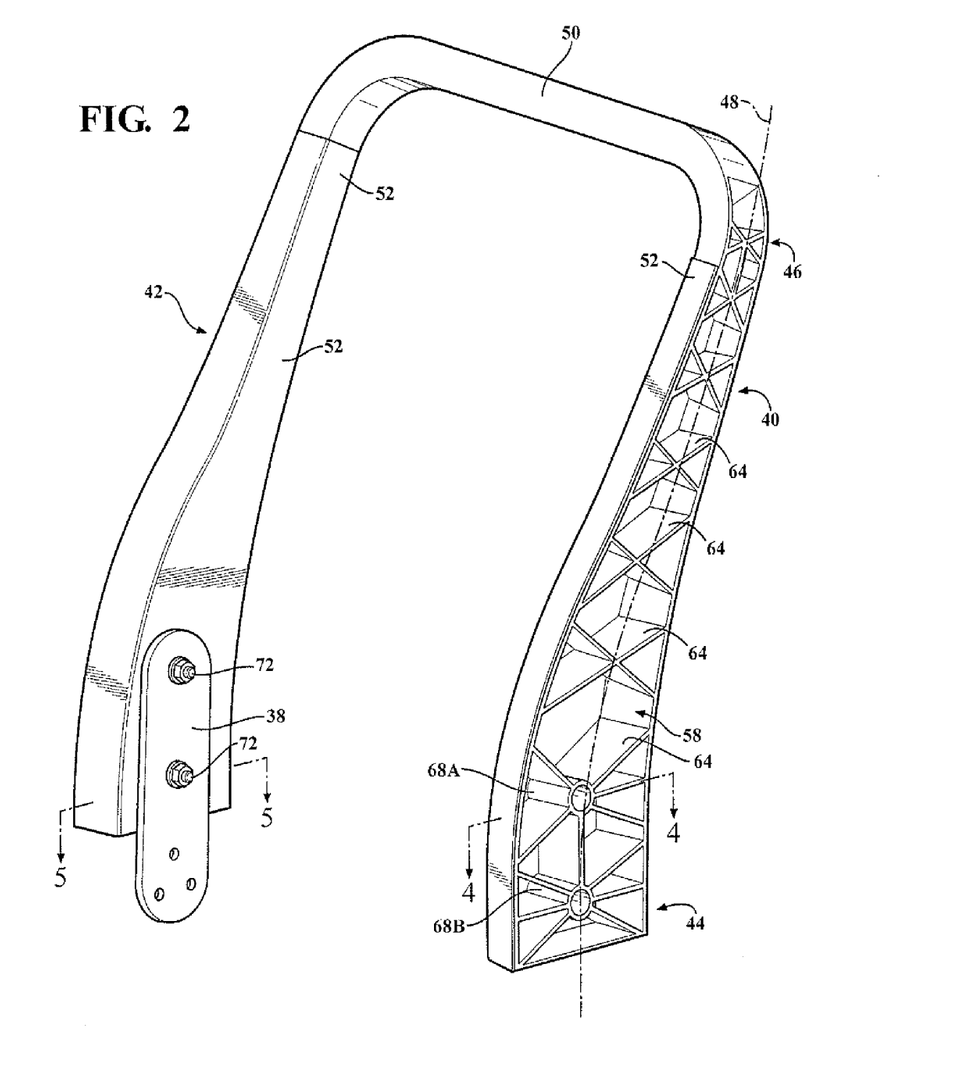
FIG. 2 is a perspective view of the back frame member of the seat.

The back frame member 36 generally extends vertically away from the seating frame member 34. The back frame member 36 includes a first side member 40 and a second side member 42 each extending generally upwardly from the seating frame member 34. The side members 40, 42 each have a proximal end 44 proximate the seating frame member 34 and a distal end 46 spaced from the seating frame member 34. With reference to FIG. 2, each of the side members 40, 42 define a side member axis 48 extending from the proximal end 44 to the distal end 46 of the side members 40, 42 dividing each of the side members 40, 42 in half. A top member 50 may be disposed between the side members 40, 42 at the distal end 46 of the side members 40, 42. Generally, the top member 50 rigidly coupled the first and second side members 40, 42 together. The top member 50 may also receive a headrest of the seat 30. It is to be appreciated that when employed, the top member 50 may be integral with the side members 40, 42 or may be a separate discrete component.

The back frame member 36 may comprise a polymeric material. The polymeric material is typically a thermoplastic material for allowing the side members 40, 42 to be injection molded. For example, the polymeric material of the side members 40, 42 may comprise a polyamide. When employed, the polyamide is selected from the group of nylon 6, nylon 6/6 and combinations thereof. The polyamide may be a fiber reinforced polyamide. An example of a suitable fiber reinforced polyamide is a glass-fiber reinforced polyamide that is commercially available from BASF Corporation under the trade name Ultramid® TG7S PA6. It should be appreciated that the side members 40, 42 may be formed from any type of suitable polymeric material, polyamide or not, reinforced or not, without departing from the nature of the present invention.

Figure 3:
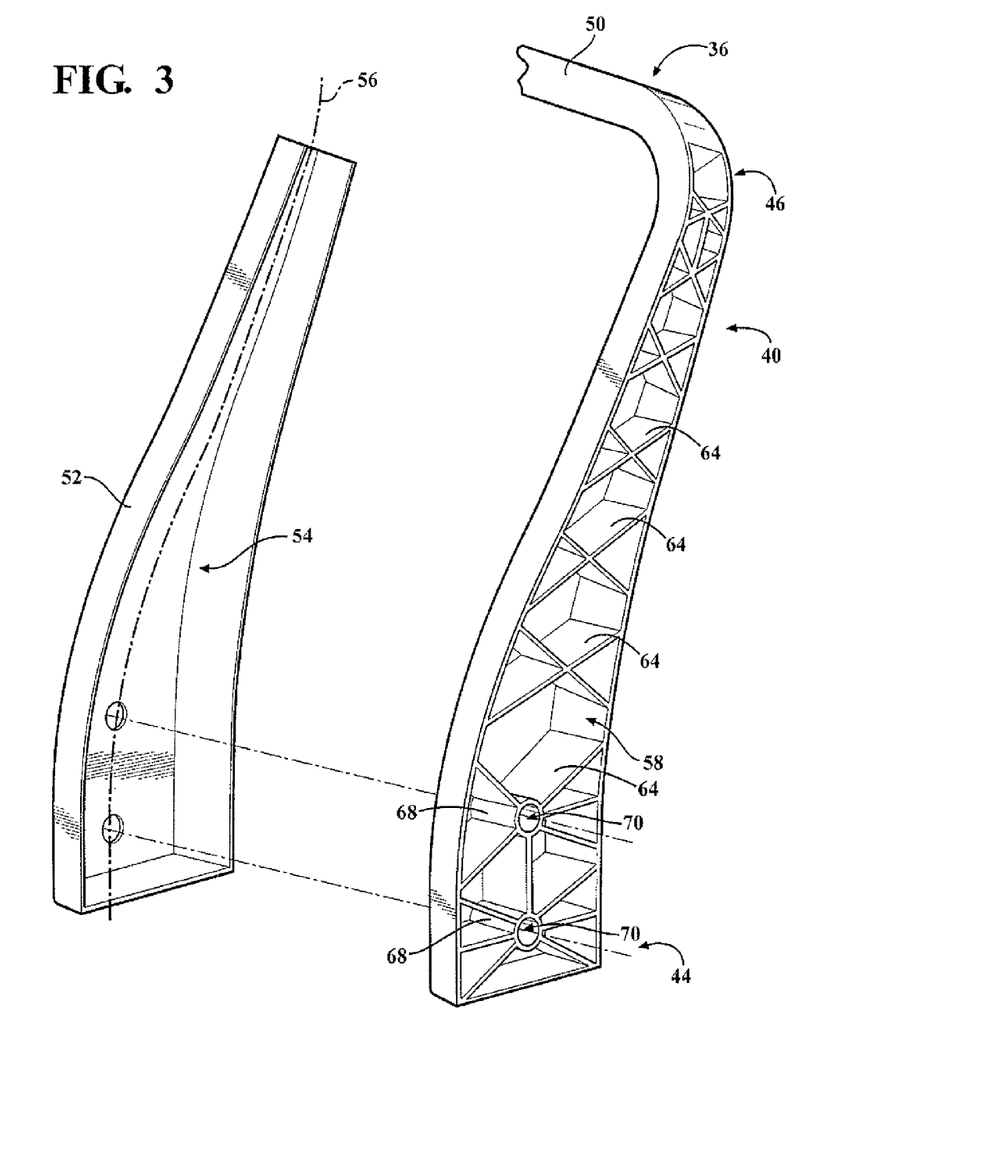
FIG. 3 is perspective assembly view of the back frame member of the seat having a reinforcing mat disposed about the back frame member.

As best shown in FIG. 3, the seat 30 may include a reinforcing mat 52 disposed about the back frame member 36. When employed, the reinforcing mat 52 imparts strength to the back frame member 36 for allowing the back frame member 36 to endure greater loads without failure as compared to the back frame member 36 without the reinforcing mat 52. The reinforcing mat 52 defines a cavity 54 presenting a general U-shaped cross-section for receiving the back frame member 36. Generally, the reinforcing mat 52, by itself, is flexible about a longitudinal axis 56 extending along the reinforcing mat 52 and may buckle when subjected to a load. As such, the back frame member 36 supports the reinforcing mat 52 to prevent flexing and buckling of the reinforcing mat 52 along the longitudinal axis 56. It is to be appreciated that when the first and second side members 40, 42 are present, the reinforcing mat 52 is disposed about each of the first and second side members 40, 42.

Typically, the reinforcing mat 52 comprises a glass-fiber filled polymeric material. It is to be appreciated that the glass-filled polymeric material may be the polymeric material of the back frame member 36 described above. Alternatively, the glass-filled polymeric material may be different from the polymeric material of the back frame member 36. Generally, glass fibers within the glass-filled polymeric material extend along the longitudinal axis 56 of the reinforcing mat 52. However, the plurality of fibers may extend in different directions or may be woven, i.e., interlaced with each other. Typically, the glass fibers are elongated such that stress on the reinforcing mat 52 is transmitted from the glass-filled polymeric material to the glass fibers. Transferring the stress allows the glass fibers to reinforce the glass-filled polymeric material.

The glass-filled polymeric material of the reinforcing mat 52 may be integrated with the glass fibers in a variety of ways. For example, the reinforcing mat 52 may be in the form of a continuous fiber reinforced mat that is preformed and subsequently integrated with the glass-filled polymeric material. An example of a suitable continuous fiber reinforced mat is that which is commercially available from Performance Materials Corporation of Camarillo, Calif. under the trade name Continuous Fiber Reinforced Thermoplastic (CFRT).

With reference to FIGS. 1-3, the back frame member 36 may define a U-shaped cavity 58 for providing the back frame member 36 with rigidity. Generally, the back frame member 36 includes a base portion 60 and two or more leg portions 62 extending from the base portion 60 to define the U-shaped cavity 58. The leg portions 62 are spaced from each other along the base portion 60. Typically, one of the leg portions 62 is adjacent the occupant 32 sitting in the seat 30 and the other leg portions 62 are spaced from the leg portion 62 adjacent the occupant 32 in a direction away from the occupant 32. It is to be appreciated that the base portion 60 and the leg portions 62 may be integrally formed. When present, the reinforcing mat 52 wraps around the base portion 60 and the leg portions 62. Additionally, when present, each of the first and second side members 40, 42 have the base portion 60 and the leg portions 62 for defining the U-shaped cavity 58.

Figure 14:
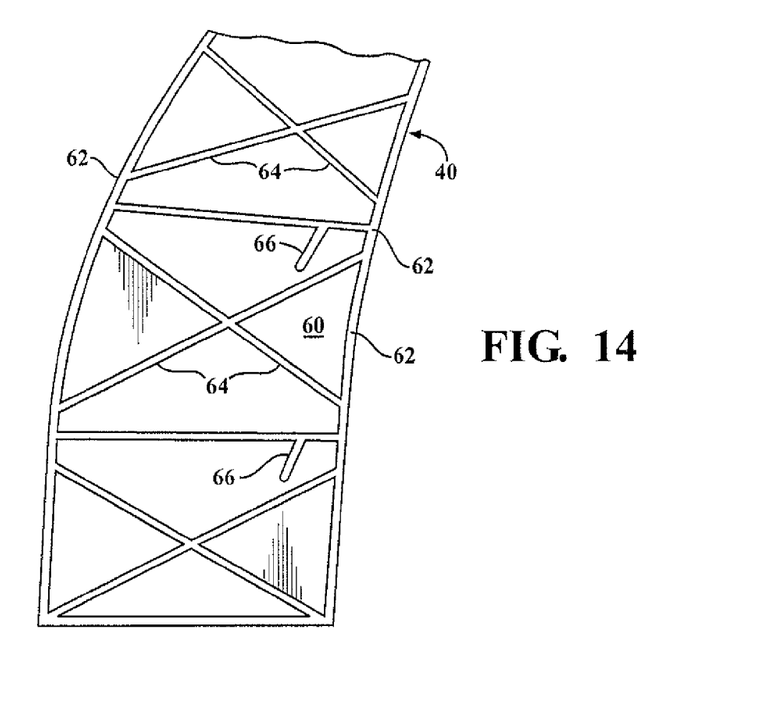
FIG. 14 is a side view of the back frame member showing fingers extending from ribs within the back frame member.

As best shown in FIGS. 1-3, a plurality of ribs 64 may be disposed within the U-shaped cavity 58 of the back frame member 36. Generally, the ribs 64 are coupled to the base portion 60 and the leg portions 62 of the back frame member 36 for reinforcing the back frame member 36. It is to be appreciated that the ribs 64 may be disposed within the U-shaped cavity 58 in any configuration suitable to reinforce the back frame member 36. Generally, the ribs 64 are arranged in a series of intersecting pairs to form a criss-cross configuration. As shown in FIG. 14, a finger 66 may extend from the ribs 64 proximate one of the leg portions 62 of the back frame member 36. The finger 66 will be described in detail below.

Figure 4:
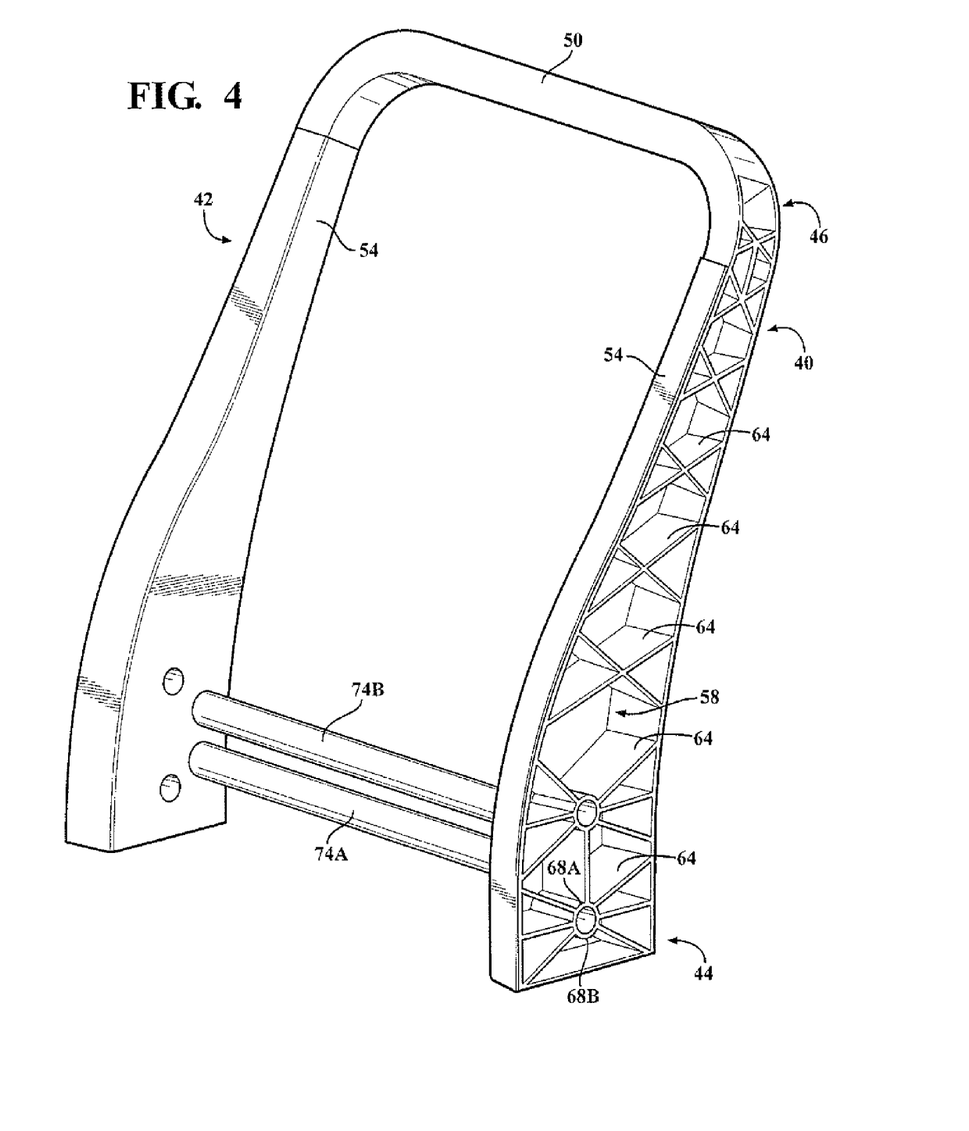
FIG. 4 is a perspective view of the seat having first and second cross members coupled to the back frame member.

As shown in FIG. 4, the seat 30 includes a first cross member 74A extending horizontally between the first side member 40 and the second side member 42. The first cross member 74A is spaced from the proximal end 44 of the side members 40, 42. The seat 30 also includes a second cross member 74B extending horizontally between the first side member 40 and the second side member 42. The second cross member 74B is spaced between the first cross member 74A and the distal end 46 of the side members 40, 42.

Generally, the first and second cross members 74A, 74B have a rectangular cross-sectional configuration. However, it is to be appreciated that the first and second cross members 74A, 74B may have other cross-sectionals, such as circular. It is also to be appreciated that the first cross member 74A may have a cross-sectional configuration that is different from the cross-sectional configuration of the second cross member 74B.

It is to be appreciated that the cross members may be coupled to the side members by any suitable method. For example, with reference to FIGS. 5 and 6, the first and second side members 74A, 74B define a plurality of anchoring holes 90 with a portion of the first and second cross members 74A, 74B disposed through the anchoring holes 90. The portion of the first and second cross members 74A, 7413 extend into the U-shaped cavity 58 of the first and second side members 40, 42. The portion of the first and second cross members 74A, 74B disposed within the U-shaped cavity 58 has a thickness that is greater than a size of the anchoring holes 90 such that the portion of the first and second cross members 74A, 74B remains within the U-shaped cavity 58 to secure the first and second cross members 74A, 74B to the side members 40, 42.

Figure 5:
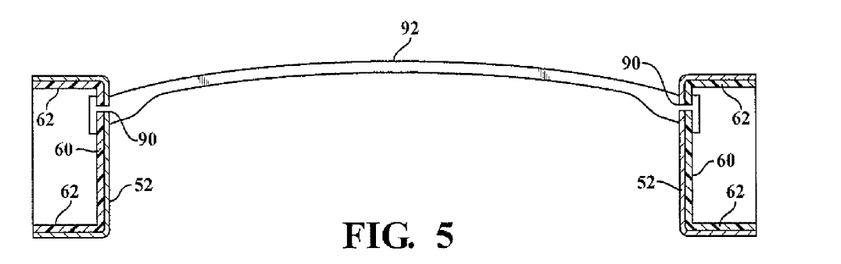
FIG. 5 is a cross-sectional view of the back frame member showing a top view of the first and second cross members having a straight configuration.
Figure 6:
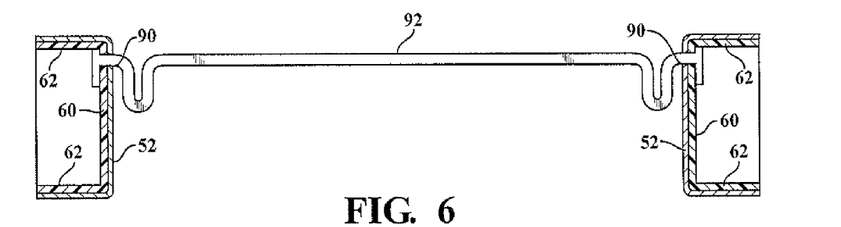
FIG. 6 is a cross-sectional view of the back frame member showing a top view of the first and second cross members having a central region flanked by bent portions.

With reference to FIG. 6, the first and second cross members 74A, 74B have a central region 92 flanked on both sides by bent portions 94 with the first and second cross members 74A, 74B folded back upon themselves within the bent portions 94. However, it is to be appreciated that the first and second cross members 74A, 74B may simply have the central region 92 thereby eliminating the bent portions 94, as shown in FIG. 5.

Figure 7:
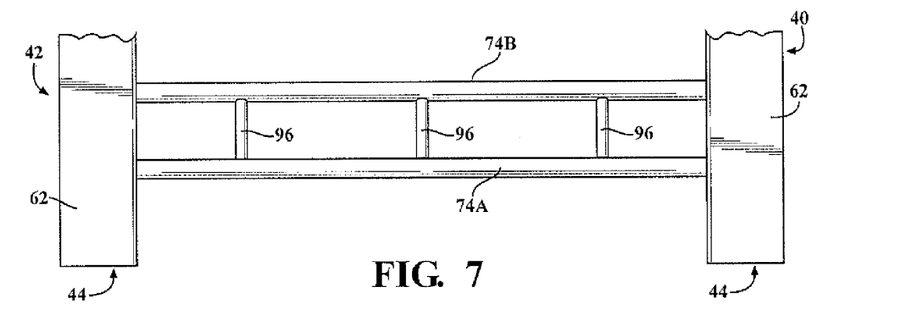
FIG. 7 is a front view of a portion of the back frame member showing a vertical member connecting the first and second cross members.
Figure 8:
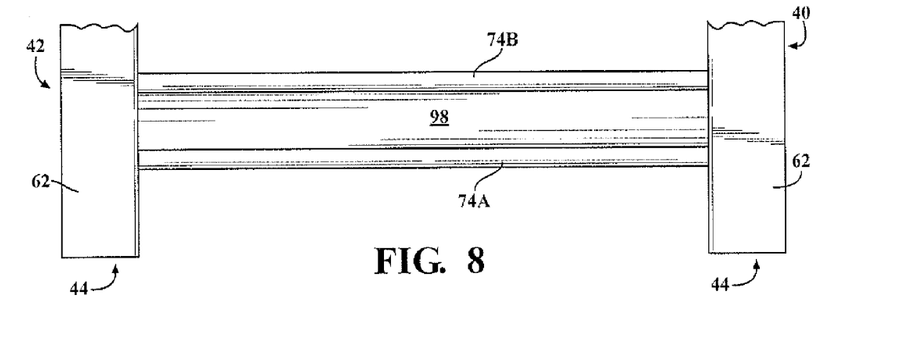
FIG. 8 is a front view of a portion of the back frame member showing a back shell interconnecting the first and second cross members.

With reference to FIG. 7, a vertical member 96 may be disposed between the first and second side members for coupling the first and second cross members together. Additionally, the vertical member 96 may be a back shell 98, which spans a distance between the first and second side members 40, 42, as shown in FIG. 8.

Generally, during a collision event, such as a rear end collision, the occupant 32 sitting in the seat 30 is impacted by the first and second cross members 74A, 74B of the seat 3Q as the vehicle is abruptly accelerated forward. As a result, the occupant 32 applies a collision force to the seat 30 and conversely, the seat 30 applies an impact force, which is related to the collision force, to the occupant 32. However, the impact force can be reduced compared to the collision force by providing an energy absorbing feature to dissipate a portion of the collision force.

Figure 9:
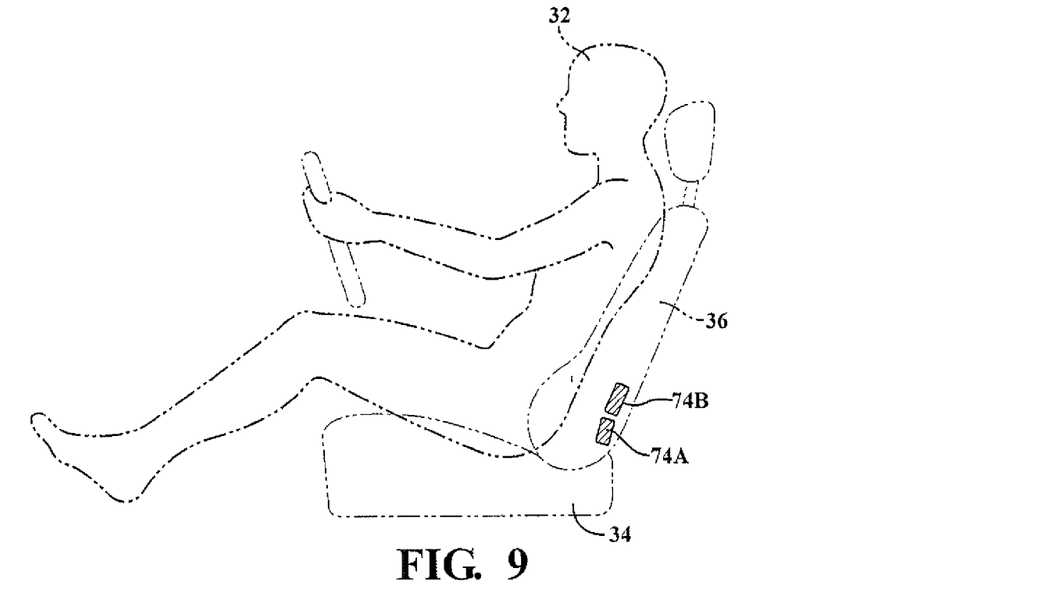
FIG. 9 is a schematic view of an occupant supported by the seat.
Figure 10:
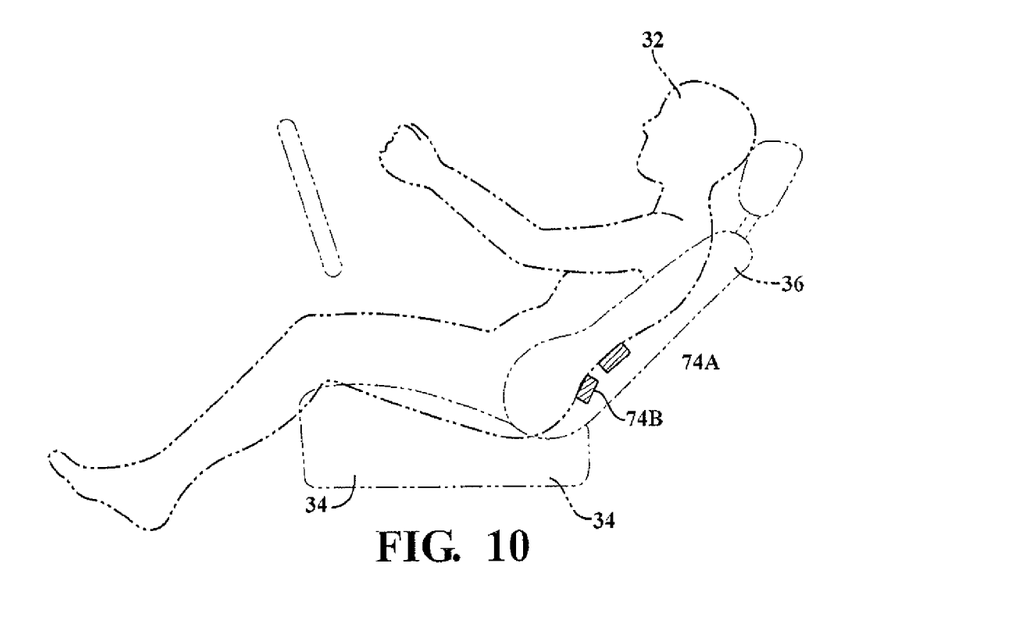
FIG. 10 is a schematic view of the occupant causing the back frame member to rotate relative to the seating frame member.

As shown in FIGS. 9 and 10, generally, the energy absorbing feature allows for a safe displacement of occupant 32 relative to the seating frame member 34. As such, the energy absorbing feature deforms during the collision event thereby safely dissipating the portion of the energy of the collision force, which in turn reduces the impact force experienced by the occupant 32.

Figure 11:
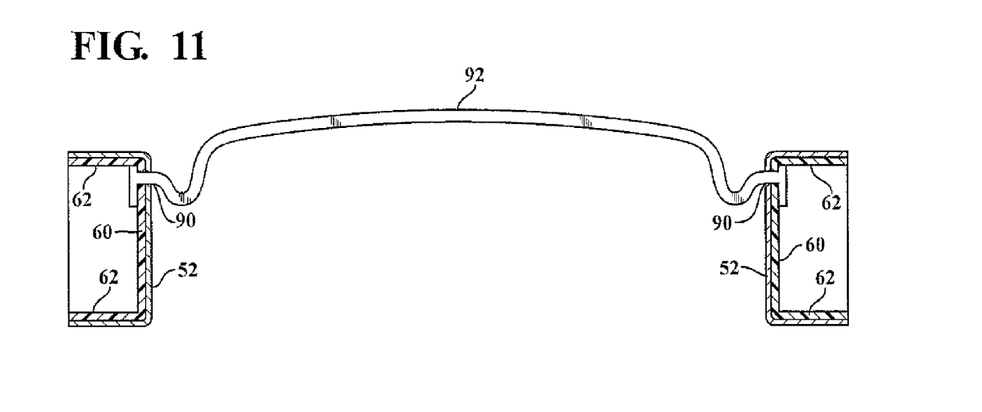
FIG. 11 is a cross-sectional view of the back frame member showing a top view of the first and second cross members being partially deformed.
Figure 12:
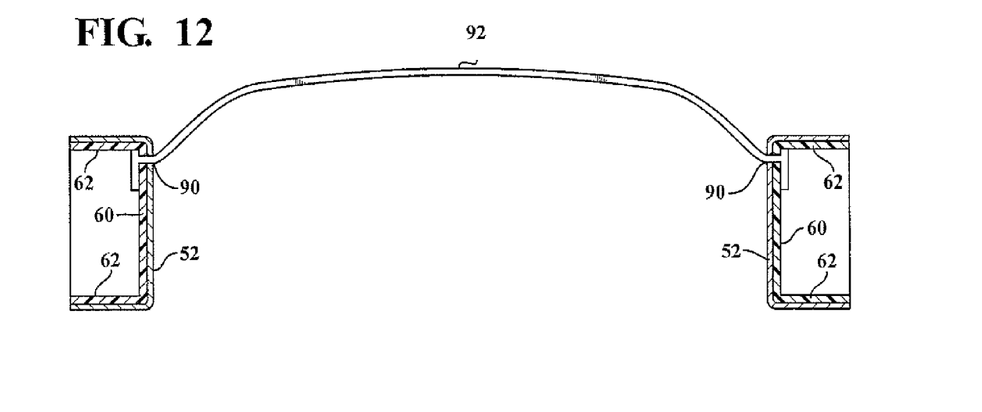
FIG. 12 is a cross-sectional view of the back frame member showing a top view of the first and second cross members being full deformed.

The first and second cross members 74A, 74B are the energy absorbing feature and deform as the occupant 32 applies the collision force to the back frame member 36. The first and second cross members 74A, 74B are typically spaced from the seating frame member 34 along the side members 40, 42 a suitable distance for allowing the occupant 32 to contact the first and second cross member 74A, 74B during the collision event. As shown in FIGS. 11 and 12, when the collision force is a force above a predetermined value, bent portions 94 straighten out and the central region 92 plastically deforms once the bent portions 94 straighten out thereby reducing the impact force transferred from the seat to the occupant caused by the force above the predetermined value. It is to be appreciated that the force above the predetermined value is higher than the normal loads applied to the first and second cross members 74A, 74B during the course of normal operation of the vehicle. Said differently, the first and second cross members 74A, 74B do not deform under normal, non-collision loads.

The plastic deformation of the first and second cross members 74A, 74B reduces the impact force transferred from the seat 30 to the occupant 32 caused by the force above the predetermined value. Generally, the occupant 32 plastically deforms the first and second cross members 74A, 74B during the collision event. Generally, the plastic deformation of the first and second cross members 74A, 74B continues until the collision force is entirely dissipated or the central region 92 of the first and second cross members 74A, 74B completely fail.

The deformation of the first and second cross members 74A, 74B results in a displacement of the occupant 32 from the standard position, shown in FIG. 9, toward the back frame member 36 of the seat 30, shown in FIG. 10. Generally, the greater the displacement of the occupant 32, the greater the deformation, which reduces the impact force experienced by the occupant 32. The displacement of the occupant 32 is dependent on a stiffness of the first and second cross members 74A, 74B, i.e., the higher the stiffness of the first and second cross members 74A, 74B, the less displacement the occupant 32 experiences. Therefore, the displacement of the occupant 32 during the collision event can be controlled by the stiffness of the first and second cross members 74A, 74B. However, the stiffness of the first and second cross members 74A, 74B must be sufficient to resist normal loads applied to the seat 30, such as when the occupant 32 enters and exits the seat 30, without deforming the first and second cross members 74A, 74B.

The stiffness of the first and second cross members 74A, 74B is dependent on the cross-sectional thickness of the first and second cross members 74A, 74B. As such, the cross-sectional thickness of the first and second cross members 74A, 74B may be varied as needed to resist deformation under normal loads.

The first and second cross members 74A, 74B may comprise any suitable material meeting the stiffness requirements necessary to resist the normal loads applied to the back frame member 36. The first and second cross members 74A, 74B may comprise a polymeric material, such as a thermoplastic material. It is to be appreciated that the polymeric material of the first and second cross members 74A, 74B may be the same as the polymeric material of the back frame member 36. As such, the first and second cross members 74A, 74B may be integrally formed with the back frame member 36. Alternatively, the polymeric material of the first and second cross members 74A, 7413 may be different from the polymeric material of the back frame member 36. Typically, the polymeric material of the first and second cross members 74A, 74B is selected from the group of nylon 6, nylon 6/6, and combinations thereof.

Figure 13:
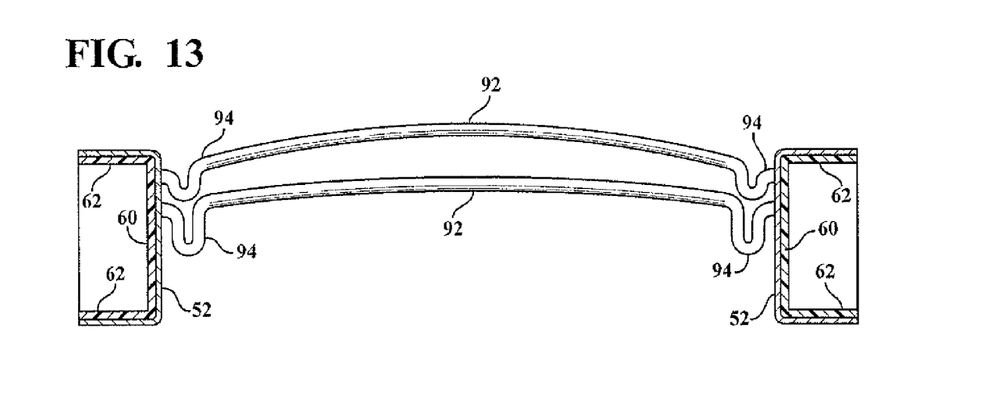
FIG. 13 is a cross-sectional view of the back frame member showing a top view of the first cross member horizontally spaced from the second cross members.

It is to be appreciated that the first cross member 74A may be horizontally spaced from the second cross member 7413, as shown in FIG. 13. When the first and second cross members 74A, 7413 are spaced from each other, the occupant 32 contacts and plastically deforms the central region 92 of the first cross member 74A before contacting and plastically deforming the central region 92 of the second cross member 74B. Alternatively, the first and second cross members 74A, 74B may be horizontally aligned such that the occupant 32 contacts and plastically deforms the central regions 92 of the first and second cross members 74A, 74B simultaneously.

Figure 15:
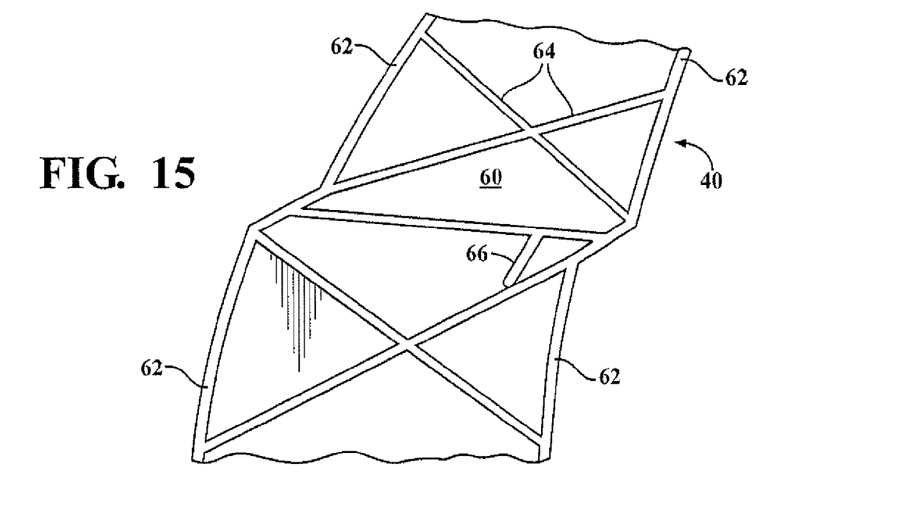
FIG. 15 is a side view showing the back frame member buckling and contacting the fingers.

The seat 30 may include other energy absorbing features. For example, as shown in FIGS. 14 and 15, when employed, the finger 66 may also be the energy absorbing feature by deforming as the back frame member 36 buckles under the collision force with a portion of the back frame member 36 impacting the finger 66. Specifically, as the occupant 32 applies the collision force to the back frame member 36, the back frame member 36 may buckle resulting in a portion of the back frame member 36 rupturing and being introduced into the U-shaped cavity 58. Once the portion of the back frame member 36 intrudes into the U-shaped cavity 58, the portion of the back frame member 36 contacts the finger 66 causing the finger 66 to deform. The buckling of the back frame member 36 and the deformation of the finger 66 results in the displacement of the occupant 32 from the standard position toward the back frame member 36 of the seat 30. As described above, the greater the displacement of the occupant 32, the greater the reduction of the impact force as compared to the collision force. It is believed that the deformation of the finger 66 and the buckling of the back frame member 36 reduces the impact force applied to the occupant 32.

As shown in FIG. 1, the seat 30 may include a boss 68 disposed within the U-shaped cavity 58 with the fastening element 72 disposed within the bore 70 of the boss 68. The boss 68 may be an additional energy absorbing feature such that the fastening element 72 deforms the boss 68 during the collision. Additional description of the boss 68 is disclosed in co-pending application serial number PCT/US2011/051571, the contents of which are incorporated by reference. Furthermore, the bracket 38 may be the energy absorbing feature and designed to deform as the back frame member 36 rotates relative to the seating frame member 34. Additional description of the bracket 38 used as the energy absorbing feature is disclosed in copending application serial number PCT/US2011/051554, the contents of which are incorporated by reference.

Generally, the impact force experienced by the occupant 32 as a result of the collision force can be minimized with the energy absorbing feature while still satisfying safe displacement requirements for the back frame member 36 of the seat 30. With the energy absorbing feature, the impact force is managed over a longer time period, thereby reducing a peak impact force acting on the occupant 32. With the reduction of the peak impact force, the occupant 32 experiences less injury and the seat 30 also experiences lower stress levels. As a result of the seat 30 experiencing lower stress levels, more optimal designs can be utilized, and the polymeric materials can be used to manage the collision force.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention.

What is claimed is:

1. A seat for supporting an occupant of a vehicle, said seat comprising:
   a seating frame member for providing a surface to support the occupant;
   a back frame member extending away from said seating frame member with said back frame member having a first side member and a second side member spaced from said first side member with each of said side members having a proximal end for coupling to said seating frame member and a distal end spaced from said proximate end;
   a first cross member extending horizontally between a first end coupled to said first side member at a first attachment location and a second end coupled to said second side member at a second attachment location with said first cross member spaced from said proximal end of said side members;
   a second cross member extending horizontally between a first end coupled to said first side member at a first attachment location and a second end coupled to said second side member at a second attachment location with said second cross member spaced vertically from said first cross member and said distal end of said side members and between said first cross member and said distal end of said side members, said first cross member and said second cross member being spaced vertically below a midpoint between said proximal end and said distal end of said side members;
   wherein each of said first and second cross members comprise a thermoplastic material;
   wherein said first and second cross members have a central region flanked on both sides by bent portions presenting a U-shaped configuration with said first and second cross members folded back upon themselves within said bent portions with said U-shaped configuration of said bent portions extending in a direction away from both said central region and said attachment locations such that said bent portions are configured to extend toward the occupant; and
   wherein said bent portions straighten out when a force above a predetermined value is applied to said first and second cross members and said central region plastically deforms once said bent portions straighten out thereby reducing an impact force transferred from said seat to the occupant caused by the force above the predetermined value.

2. A seat as set forth in claim 1 further comprising a vertical member disposed between said first and second cross members for coupling said first and second cross members together.

3. A seat as set forth in claim 2 wherein said vertical member is a back shell, which spans a distance between said first and second side members.

4. A seat as set forth in claim 1 wherein said first cross member is horizontally spaced from said second cross member such that the occupant contacts and plastically deforms said central region of said first cross member before contacting and plastically deforming said central region of said second cross member.

5. A seat as set forth in claim 1 wherein said first and second cross member are horizontally aligned such that the occupant contacts and plastically deforms said central regions of said first and second cross member simultaneously.

6. A seat as set forth in claim 1 wherein each of said first and second side members have a base portion and two or more leg portions defining a U-shaped cavity.

7. A seat as set forth in claim 6 wherein said first and second side members and said first and second cross members comprise a polymeric material.

8. A seat as set forth in claim 7 wherein said polymeric material is selected from the group of nylon 6, nylon 6/6, and combinations thereof.

9. A seat as set forth in claim 7 wherein said first and second cross members are integral with said first and second side members.

10. A seat as set forth in claim 9 further comprising a reinforcing mat disposed about said base portion and said leg portions of said first and second side members with said reinforcing mat comprising a glass-fiber filled polymeric material for imparting strength to said back frame member.

11. A seat as set forth in claim 10 wherein said reinforcing mat and said first and second side members define a plurality of anchoring holes with a portion of said first and second cross members disposed through said anchoring holes and into said U-shaped cavity of said first and second side members.

12. A seat as set forth in claim 11 wherein said portion of said first and second cross members disposed within said U-shaped cavity has a thickness that is greater than a size of said anchoring holes such that said portion of said first and second cross members remains within said U-shaped cavity as said bent portions straighten out and said central regions plastically deform.

13. A seat as set forth in claim 1 wherein each of said first and second side members define a pair of anchoring holes for receiving said first and second cross members to couple said first and second cross members to said first and second side members.

14. A seat as set forth in claim 1 wherein said first and second cross members have a rectangular cross-section.

15. A seat for supporting an occupant of a vehicle, said seat comprising:
a seating frame member for providing a surface to support the occupant;
a back frame member extending away from said seating frame member with said back frame member having a first side member and a second side member spaced from said first side member with each of said side members having a proximal end for coupling to said seating frame member and a distal end spaced from said proximate end;
a first cross member extending horizontally between said first side member and said second side member with said first cross member spaced from said proximal end of said side members;
a second cross member extending horizontally between said first side member and said second side member with said second cross member spaced vertically from said first cross member and said distal end of said side members and between said first cross member and said distal end of said side members, said first cross member and said second cross member being spaced vertically below a midpoint between said proximal end and said distal end of said side members;
a vertical member disposed between said first and second cross members for coupling said first and second cross members together;
wherein each of said first and second cross members comprise a thermoplastic material;
wherein said first and second cross members have a central region flanked on both sides by bent portions with said first and second cross members folded back upon themselves within said bent portions;
wherein said bent portions straighten out when a force above a predetermined value is applied to said first and second cross members and said central region plastically deforms once said bent portions straighten out thereby reducing an impact force transferred from said seat to the occupant caused by the force above the predetermined value; and
wherein said first cross member is horizontally spaced from said second cross member such that the occupant contacts and plastically deforms said central region of said first cross member before contacting and plastically deforming said central region of said second cross member.

* * * * *

UNITED STATES PATENT AND TRADEMARK OFFICE
CERTIFICATE OF CORRECTION

Page 1 of 1

PATENT NO. : 9,434,281 B2
APPLICATION NO. : 13/823038
DATED : September 6, 2016
INVENTOR(S) : Jonathan Evans It is certified that error appears in the above-identified patent and that said Letters Patent is hereby corrected as shown below:

On the Title Page

Item (60) Related U.S. Application Data, please delete "Provisional application No. 61/382,581", and replace with -- Provisional application No. 61/382,582 --

Signed and Sealed this
Twenty-eighth Day of February, 2017

Michelle K. Lee
*Director of the United States Patent and Trademark Office*